Nov. 10, 1970  J. G. BARTAS  3,539,395
SYSTEM AND PROCESS FOR THE INDIRECT ELECTROCHEMICAL
COMBINATION OF AIR AND A REFORMABLE FUEL
Filed Feb. 25, 1966  3 Sheets-Sheet 1

Inventor:
Jacob G. Bartas,
by Carl O. Thomas
His Attorney.

Inventor:
Jacob G. Bartas,
by Carl O. Thomas
His Attorney.

Inventor:
Jacob G. Bartas,
by Carl O. Thomas
His Attorney.

United States Patent Office 3,539,395
Patented Nov. 10, 1970

3,539,395
SYSTEM AND PROCESS FOR THE INDIRECT ELECTROCHEMICAL COMBINATION OF AIR AND A REFORMABLE FUEL
Jacob George Bartas, Topsfield, Mass., assignor to General Electric Company, a corporation of New York
Filed Feb. 25, 1966, Ser. No. 530,188
Int. Cl. H01m 27/12
U.S. Cl. 136—86                                          9 Claims

ABSTRACT OF THE DISCLOSURE

A system and process for efficiently converting a reformable fuel into hydrogen for oxidation at an anode of a fuel cell and for recovering the water formed as a reaction product of the fuel cell for use in reforming the fuel. The temperature of an electrolyte included within the fuel cell is partially equilibrated with the temperature of the reformate upstream of the anode and the temperatures of both the reformate and electrolyte are simultaneously lowered by heat rejection to a cooling air stream. The system and process are controlled so as to maintain a state of dynamic equilibrium.

My invention relates to a process and system for the generation of electrical energy through the indirect use of a reformable fuel.

It is an object of my invention to provide a process and system for reliably generating electrical energy at low cost and high efficiency over extended periods.

It is another object to provide a process and system for electrical energy generation in which periodic supply of reformable fuel constitutes the sole logistic requirement.

It is another object to provide a system for maintaining a functioning fuel cell in a state of dynamic equilibrium.

It is an additional object to provide a system for the controlled recovery of water from a fuel cell.

In one generic aspect my invention is directed to a process for generating electrical energy comprising providing an electrolyte in ionically conductive relation between an anode and a cathode serving as electrodes of a fuel cell. A mixture of water and reformable fuel is reacted to generate a reformate including hydrogen. The hydrogen from the reformate is delivered to the anode while an oxidant is delivered to the cathode. Simultaneously the water consumed in generating the reformate is replenished with water formed as a reaction product by the fuel cell.

My system for generating electrical energy is in one aspect comprised of a fuel cell which includes a cathode, an anode, electrolyte means interposed between the cathode and anode, and means forming a hydrogen chamber adjacent the anode. Means are provided serving as a water source and a fuel source. Means are provided extending between each of the source means and the hydrogen chamber means including means for reforming a mixture of water and fuel from the source means to generate a reformate including hydrogen gas. Finally, means are provided for delivering water formed as a reaction product by the fuel cell to the means serving as a water source.

Figure 1:
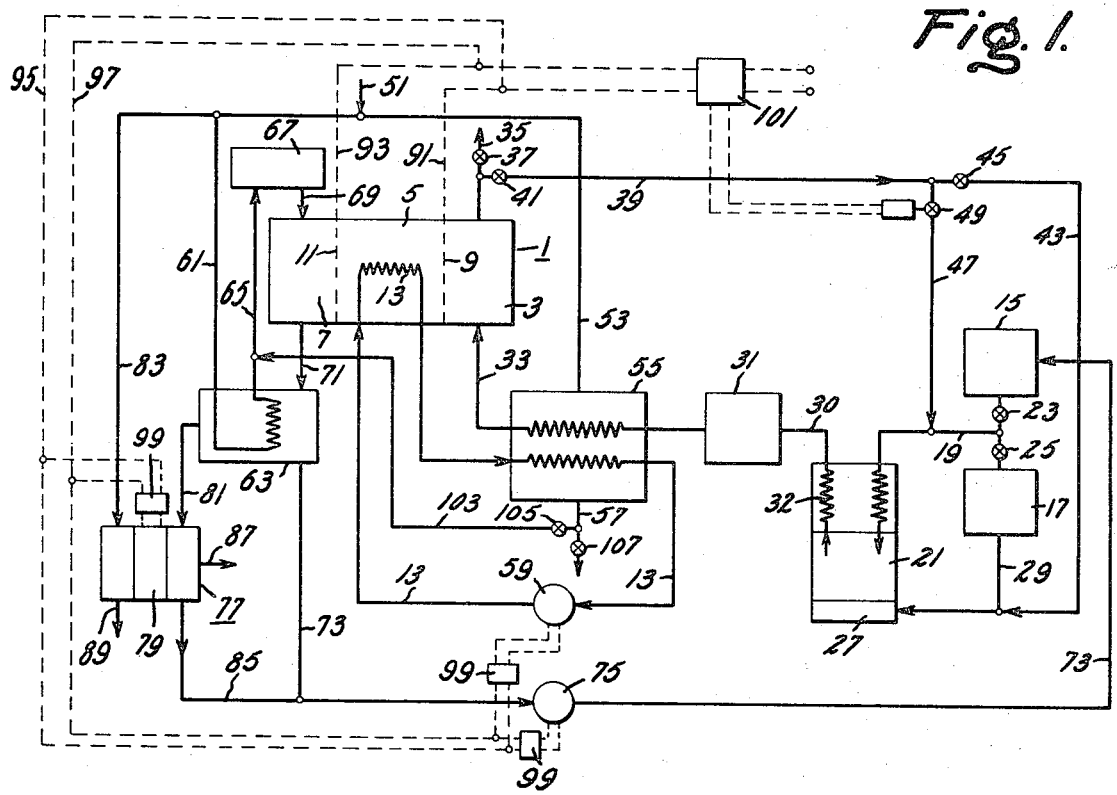
Figure 2:
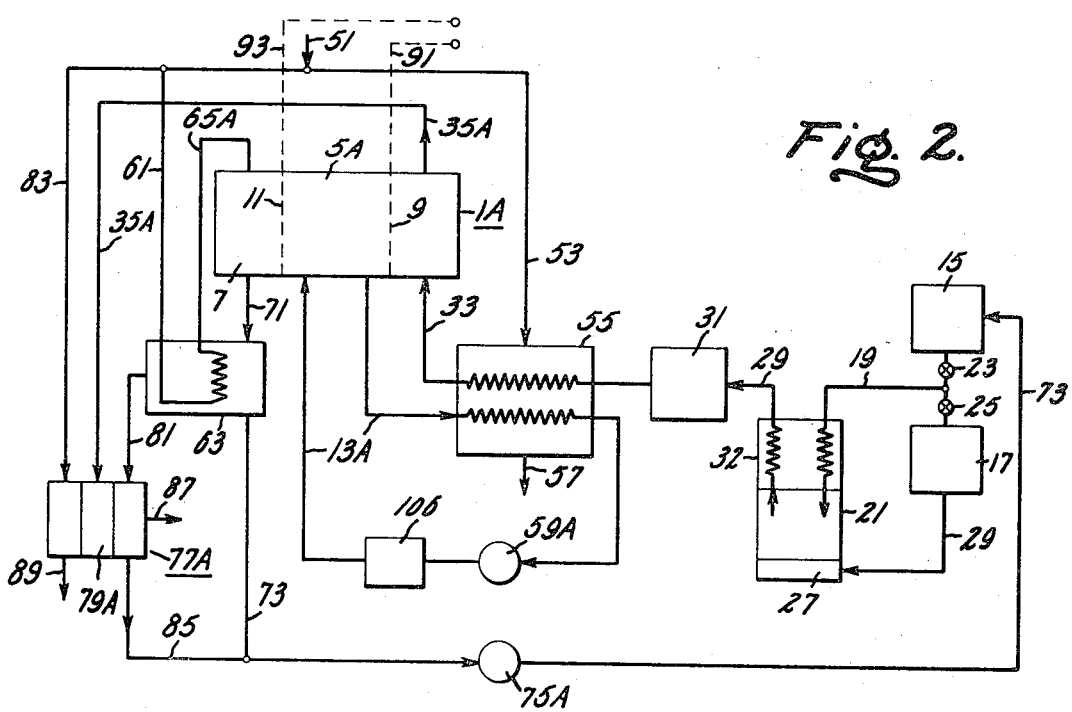
Figure 3:
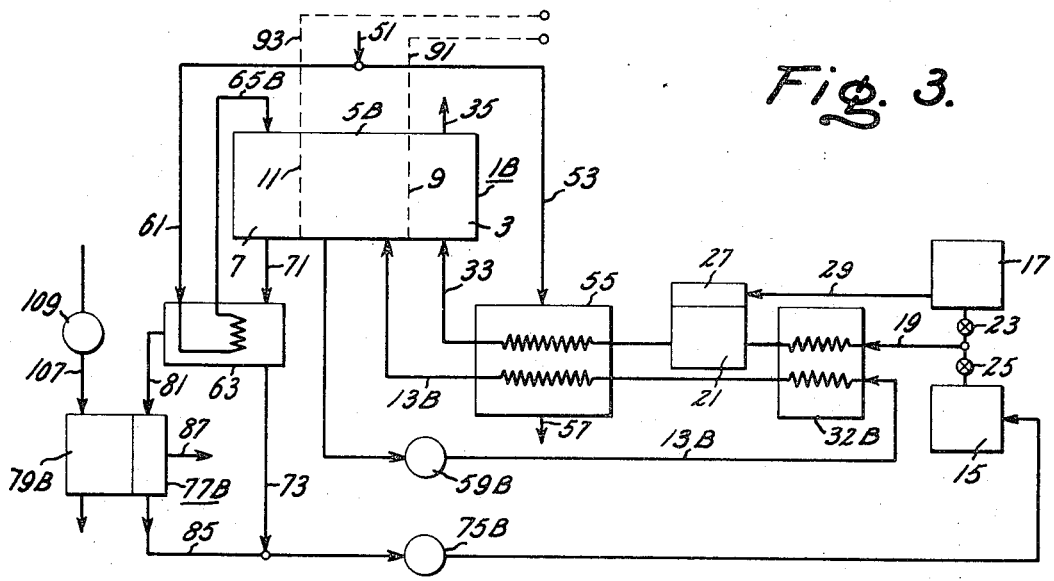
Figure 4:
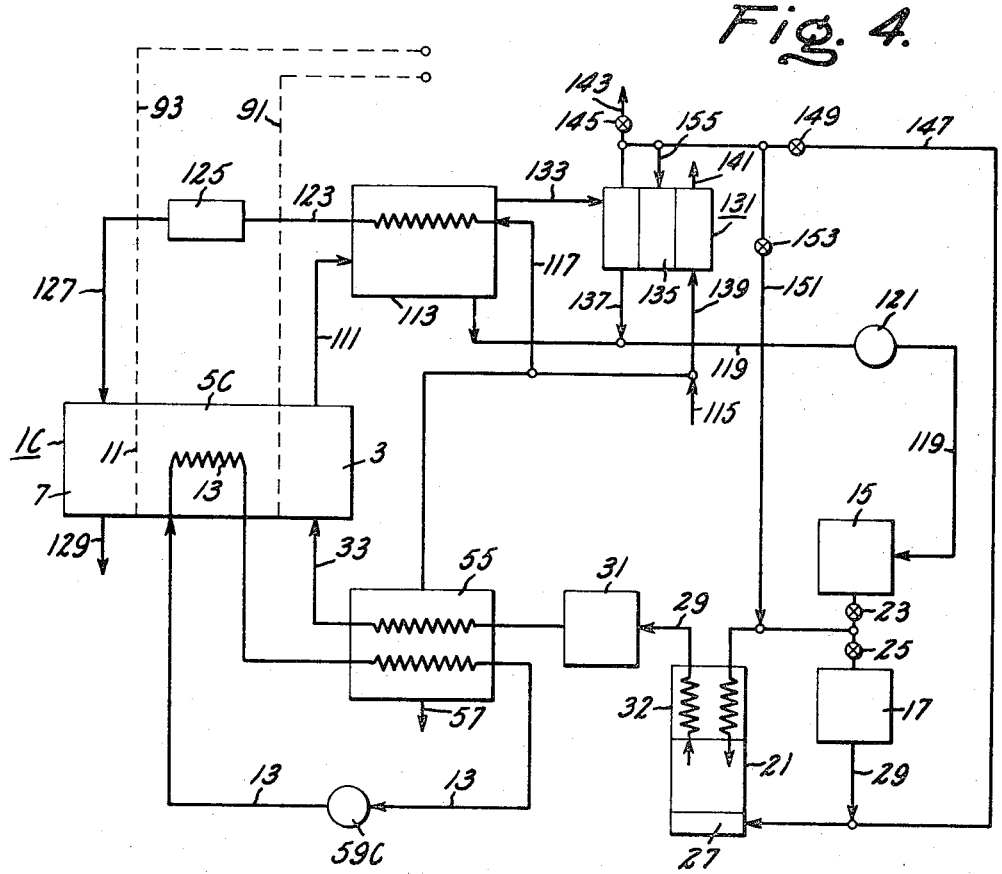
Figure 5:
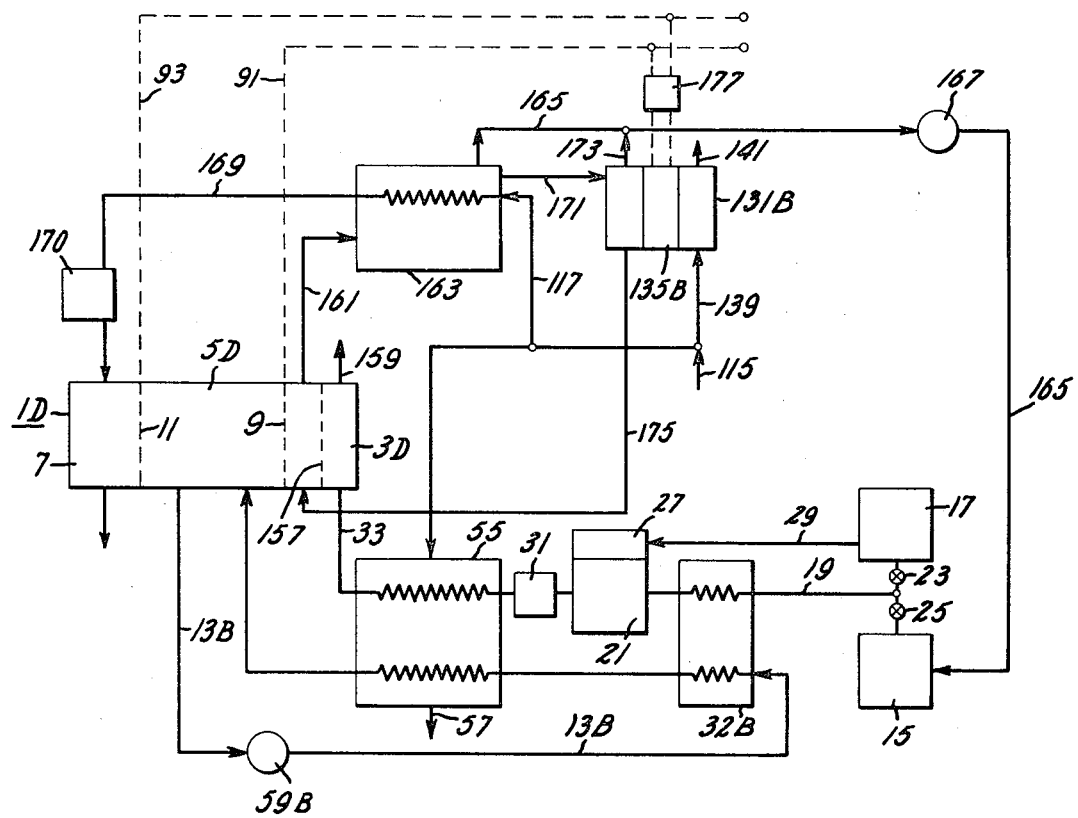

My invention may be better understood by reference to the following detailed description considered in conjunction with the drawings, in which FIG. 1 is a schematic diagram of a system according to my invention having utility with fuel cells having a cationic or acid immobilized electrolyte, FIG. 2 is a schematic diagram of a system having utility with certain low temperature free aqueous acid electrolyte fuel cells, FIG. 3 is a schematic diagram of a system having utility with certain higher temperature free aqueous acid electrolyte fuel cells, FIG. 4 is a schematic diagram of a system having utility with fuel cells having an anionic or alkaline immobilized electrolyte, and FIG. 5 is a schematic diagram of a system having utility with aqueous alkaline electrolyte fuel cells.

FIG. 1 illustrates a preferred system for generating electrical energy from a reformable fuel using a fuel cell having an immobilized cationic electrolyte. The fuel cell 1 is schematically shown divided into a hydrogen chamber means 3, an electrolyte means 5, and an oxidant chamber means 7, and having an anode 9 interposed between the hydrogen chamber means and the electrolyte means and a cathode 11 interposed between the oxidant chamber means and the electrolyte means. The fuel cell is per se conventional and may be chosen from any one of a variety of well known immobilized cationic electrolyte fuel cells. The electrolyte means may include an acid adsorbed in a capillary matrix or may be comprised of a cation exchange membrane. As shown the fuel cell is provided with a conduit means 13 for circulation of coolant located in indirect heat transfer relation with the electrolyte means. While the fuel cell is schematically illustrated as a single cell unit, it is appreciated that it may be comprised of a battery of cells. The fuel cells employed in the Gemini spacecraft are exemplary of the type of conventional fuel cells suitable for use in this system.

In order to supply hydrogen to the hydrogen chamber means of the fuel cell a means 15 constituting a source of water and a means 17 constituting a source of reformable fuel are provided. Conduit means 19 are provided to deliver a mixture of water and fuel from the source means to a reformer 21. Valve means 23 and 25 are provided to proportion flow from the water source means and the fuel source means, respectively. The reformer is heated by a burner 27. A conduit means 29 is provided to deliver fuel from the fuel source means to the burner.

As employed in this application the term "reformer" refers to any conventional apparatus for generating hydrogen by the reaction of water and a reformable fuel. Of the known reformable fuels hydrocarbons and alcohols are generally preferred for economic reasons. It is preferred to employ a catalytic reformer employing a conventional reforming catalyst such as may be obtained commercially from Englehardt Industries, Girdler, the Institute of Gas Technology, etc. In reforming water and hydrocarbon or alcohol mixtures, such reformers are typically operated in temperature ranges of from 800° to 1400° F. depending on the specific feed stock and catalyst chosen. The reformer reacts the water and fuel mixture to generate hydrogen having quantities of water, methane, carbon dioxide, carbon monoxide, and various trace materials entrained. While only one reforme is shown in FIG. 1 it is appreciated that it may be desirable to employ two or more reformers in series having like or differing catalysts in order to obtain most efficient hydrogen generation.

The hydrogen generated in the reformer together with the entrained materials—conventionally referred to as "impure hydrogen"—is circulated from the reformed to a means 31 for reducing the carbon monoxide content by a conduit means 30. In order to conserve the heat supplied to the feed in the reformer it is preferred to provide a vaporizer 32 whereby the excess sensible heat in the hydrogen stream may be used to vaporize at least a portion of the water-fuel mixture entering the reformer. The vaporizer is shown in its preferred form as an indirect counter-current heat exchange, although othe types of indirect heat exchangers could be employed, if desired.

The means for reducing the carbon monoxide content of the hydrogen stream is employed, since carbon monoxide tends to poison the electrocatalyst incorporated in the anode. Since cationic or acid electrolyte fuel cells are relatively insensitive to carbon monoxide as compared to anionic or alkaline electrolyte fuel cells, it is unnecessary that all or substantially all of the carbon monoxide be removed from the feed. Any one of a variety of conventional means for reducing carbon monoxide content may be emplyed. A preferred apparatus is a carbon monoxide shifter which reacts carbon monoxide with water to form carbon dioxide and hydrogen. Another device which may be employed is a methanator, a device which reacts carbon monoxide with hydrogen to generate methane and water. It is appreciated that a plurality of carbon monoxide reducing means of like or differing character may be employed in series, if desired.

The hydrogen stream is fed into the hydrogen chamber means of the fuel cell by a conduit means 33. The non-utilizable portions of the hydrogen stream, such as water vapor, carbon dioxide, etc., along with small amounts of entrained hydrogen may be rejected to the atmosphere from the hydrogen chamber means through conduit means 35. According to an optional arrangement of the system the conduit means is shown provided with a flow control means 37. A conduit means 39 controlled by a valve means 41 is provided to receive all or part of the exhaust stream from the hydrogen chamber means. The exhaust stream may be delivered to conduit means 43 controlled by valve means 45 to supplement or fully supply the fuel requirements of the reformer burner. Alternately, the exhaust stream may be returned to the feed upstream of the reformer through conduit means 47 controlled by flow regulating means 49.

In providing a system for generating electrical energy reliably and efficiently for extended periods of time it is necessary to maintain the fuel cell in a state of dynamic equilibrium. As electrical energy is generated by the fuel cell, the temperature of the fuel cell will rise above the ambient level. This is attributable to internal resistive power losses in the electrolyte means and to polarization losses in the electrodes. When an organic electrolyte is employed, such as a cation exchange resin, the temperature of the fuel cell cannot be allowed to exceed 200° F. without serious chemical degradation of the electrolyte and for extended operation it is generally preferred to maintain the electrolyte below 140° F. Also, in using any immobilized electrolyte fuel cell it is essential that water not be removed from the fuel cell at a faster rate than it is replenished by formation of water as a reaction product. Further, it is desirable in any fuel cell for the temperature of the reactants to approximate that of the fuel cell so that thermal sresses within the fuel cell may be minimized.

Accordingly, in a preferred form of my system an air supply means 51 is provided. Air is delivered by this means to a duct means 53 leading to an indirect heat exchanger 55. The heat exchanger allows excess heat in the hydrogen stream present in conduit means 33 to be rejected to the air. As shown conduit means 13 for circulation of coolant is also connected to the heat exchanger. Heat picked up by the coolant by indirect heat transfer with the electrolyte means is then also rejected to the air stream. Simultaneously the temperatures of the coolant and the hydrogen stream are partially equilibrated. Heat laden air is rejected from the heat exchanger at 57. While it is preferred that a single heat exchanger be employed to reject heat from the coolant and the hydrogen stream and also at least partially equilibrate the temperature of the coolant and hydrogen stream, it is appreciated that a plurality of heat exchangers could be used for this purpose. For example, the coolant and hydrogen stream could be cooled in separate heat exchangers and then equilibrated in a third heat exchanger. A pump means 59 is shown to facilitate circulation of the coolant through the electrolyte means and heat exchanger.

Air is delivered additionally from the air supply means to the oxidant chamber means of the fuel cell. For this purpose an air duct 61 is provided connected to an indirect heat exchanger 63. The incoming air is transferred from the heat exchanger to a humidifier 67 by a duct 65. Air is delivered to the oxidant chamber means by a conduit means 69. The unreacted portions of the air along with the fuel cell reaction products are transferred from the oxidant chamber means to the heat exchanger 63 by a conduit means 71. Thus, the temperature of the incoming air is at least partially equilibrated with that of the oxidant chamber exhaust stream. After being warmed in the heat exchanger, the incoming air stream is transported to the humidifier to assure a high order of humidity before introduction into the oxidant chamber means. This prevents water being removed from the fuel cell at a faster rate than it can be replenished. To illustrate, if air at 100 percent relative humidity were delivered from the air supply means directly to the oxidant chamber means, the air would be heated in the oxidant chamber means and thereby increase its moisture carrying capacity. Accordingly, under a wide range of ambient temperature conditions, it is apparent that feeding air directly to the oxidant chamber means may cause a net loss of water from the fuel cell and hence eventual fuel cell failure. The humidifier insures that the entering air stream is carrying sufficient moisture to prevent a net loss of water. The heat exchanger 63 performs the functions of equilibrating the temperature of the incoming air with the temperature of the fuel cell, thereby minimizing thermal stresses and also of heating the air so that it can carry increased quantities of moisture into the oxidant chamber means.

Another aspect of my invention is to provide a system which does not require the periodic addition of water. If hydrocarbon and water are used to generate reformate and if the exhaust stream from the oxidant chamber means is vented to the atmosphere, it would be necessary to supply both water and hydrocarbon to the system in order to generate electrical energy for a protracted period. Acccordingly, it is a feature of my system to additionally utilize the heat exchanger 63 to condense moisture from the oxidant chamber exhaust stream. The condensate is delivered to the water source means by conduit means 73 having pump means 75 connected therein.

When the temperature of the ambient air is relatively low as compared to the operating temperature of the fuel cell, the heat exchanger 63 may provide sufficient condensate to completely replenish the water taken from the water source means. To assure a flexible system capable of operating over a wide range of ambient conditions, it is necessary to provide means for recovering additional water from the exhaust stream leaving the heat exchanger 63. For this purpose I provide a refrigerator 77. The refrigerator is comprised of refrigeration unit 79 which withdaws heat from the exhaust stream delivered from the heat exchangers 63 by conduit means 81. At the same time heat is rejected to an air stream delivered by conduit means 83 from the air supply means. Conduit means 85 are provided to deliver the additional condensate to the water source means. The remaining gaseous exhaust from the oxidant chamber means is shown vented to the atmosphere at 87 while the heat laden air exhaust is shown at 89.

In order to withdraw electrical energy from the fuel cell electrical leads 91 and 93 are attached to the cathode and anode, respectively. Electrical leads 95 and 97 are provided to supply electrical energy from the leads 91 and 93, respectively, to the refrigeration unit 79, pump means 59, and pump means 75. As shown the refrigeration unit and pump means are each provided with an electrical control means 99 and are electrically connected in parallel. Additionally a control means 101 is attached to the leads 91 and 93. Control means 101 is electrically connected to flow regulating means 49. The control means 101 senses the rate of current flow through electrical leads 91 and 93. When the current flow drops below a predetermined minimum, the control means opens the flow regulating means allowing the exhaust stream to be fed into the water and fuel mixture upstream of the reformer. This then allows the flow of hydrogen to the fuel cell at a relatively uniform rate even when the fuel cell is delivering variable amounts of electrical energy. While it would be expected that fuel would be wasted by maintaining a uniform rate of feed at low power demand, the recirculation of hydrogen through conduit means 47 back to the reformer prevents fuel from being lost. While the conduit means 47 is shown delivering hydrogen to conduit means 19, the conduit means 47 could as well deliver hydrogen directly to the reformer. The rate of water and fuel supply to the reformer is noted to be regulated by the back pressure of the hydrogen. When the fuel cell is not applying electrical energy, no hydrogen is consumed and the back pressure effectively stops the flow of reactants.

As another auxiliary aspect of my system I provide conduit means 103 for delivering heat laden air from the heat exchanger 55 to the conduit means 65. Valve means 105 and 107 are provided to allow optional venting of the heat laden air or circulation to the oxidant chamber through conduit means 103. This feature of the system may have particular utility in applications where ambient temperature is exceptionally low so that sufficient condensation can be achieved without circulating all the incoming air through the heat exchanger 63. It is, of course, unlikely that the conduit means 103 and the refrigerator 77 would be used concurrently, although there is no reason why this could not be done.

FIG. 2 illustrates a system for electrical energy generation including a fuel cell 1A having an electrolyte means 5A including a free aqueous acid electrolyte intended to operate at temperatures below approximately 200° F. Sulfuric acid electrolyte fuel cells are typical. Portions of the system shown in FIG. 2 that correspond to the system shown in FIG. 1 are assigned like reference numerals and require no additional explanation.

One of the distinctive features of the system shown in FIG. 2 is the fact that the electrolyte itself is circulated through conduit means 13A, rather than a coolant. It is appreciated that a coolant could be employed, if desired. As an additional feature the conduit means 13A delivers the acid to a means 106 which serves as an acid conditioner. Such conditioning means are well understood in the art. Such means allow the strength of the acid to be monitored and adjusted as well as allowing the removal of any incidental impurities that may be detected. The pump means 59A differs from pump means 59 in that it does not require electrical energy. The pump means could, for example, be manually operable. Similar comment applies to pump means 75A.

The system shown in FIG. 2 could, if desired, employ the same structure for handling the exhaust stream from the hydrogen chamber means as illustrated in FIG. 1. Additionally, the FIG. 2 system could employ the same refrigerator arrangement shown in FIG. 1. Nevertheless, to teach the use of alternate structural arrangement applicable to either of the systems shown in FIGS. 1 and 2, FIG. 2 shows a refrigerator 77A which differs from refrigerator 77 in having a gas powered refrigeration unit 79A. Gas is fed to the refrigeration unit through conduit means 35A extending from the hydrogen chamber means. While conduit means 103 is omitted from the system shown in FIG. 2, it could be added, if desired. It is noted that the humidifier 67 shown in FIG. 1 is omitted from FIG. 2. Since water may be added to the free aqueous acid through electrolyte conditioner 106 and since aqueous electrolyte fuel cells are relatively insensitive to water loss as compared to immobilized electrolyte fuel cells, the humidifier does not constitute a necessary part of the system.

FIG. 3 illustrates a system generally similar to the systems shown in FIGS. 1 and 2 but differing in being particularly adapted for use with a fuel cell including a free aqueous acid electrolyte and intended to operate in a temperature range of from 200° F. to 450° F. Phosphoric acid is a common electrolyte for use in such fuel cells. Portions of the system shown in FIG. 3 that correspond to the system shown in FIG. 1 are assigned like reference numerals and require no additional explanation.

As shown in FIG. 3 a fuel cell 1B is provided differing from fuel cell 1 in having an electrolyte means 5B comprised of a free aqueous acid electrolyte adapted to operate efficiently in a temperature range of from 200° F. to 450° F. The free aqueous acid electrolyte is preferably phosphoric acid. Conduit means 13B are provided to circulate the electrolyte from the electrolyte means of the fuel cell to the vaporizer 32B. Since the electrolyte is maintained above the boiling temperature of water, it is capable of transforming to steam the water in the feed. Subsequent to passing through the vaporizer the electrolyte is passed to the heat exchanger 55 for at least partial equilibration with the feed and for cooling by the air stream.

The means for reducing the carbon monoxide content of the reformate is noted to be omitted from the system shown in FIG. 3. This points up the advantage of phosphoric acid electrolyte systems in that the fuel cell is relatively insensitive to carbon monoxide and no means for its elimination is required. It is appreciated that such means could, however, be included if desired. It is noted also that the conduit means 35 rejects the exhaust stream from the hydrogen chamber means to the atmosphere. In the alternative the structure for circulation of the exhaust stream illustrated in FIG. 1 could be provided. It is noted also that the humidifier 67 shown in FIG. 1 is omitted, since aqueous electrolyte fuel cells do not require careful control of the humidity of the oxidant. No acid conditioning means is provided for the electrolyte, since phosphoric acid is relatively insensitive to the presence of impurities and since the acid sets up a stable equilibrium at proposed operating temperatures which makes the separate addition or removal of water unnecessary.

A modified form of refrigerator 77B is illustarted. A refrigerant is circulated from an external source to the refrigeration unit 79B through conduit means 107. A pump means 109 is shown for this purpose. The refrigerant could, for example, be obtained by adiabatically expanding LPG derived from the fuel source means. The heat laden LPG could then be supplied to the burner or vaporizer. The refrigeration units 77, 77A, and 77B may be used interchangeably in the systems shown in FIGS. 1–3 inclusive. Pump means 59B, 75B, and 109 may be powered by the fuel cell or may be separately powered.

FIG. 4 illustrates a system constructed according to my invention including a fuel cell 1C differing from fuel 1 solely in utilizing an anionic or alkaline immobilized electrolyte in lieu of a cation or acid immobilized electrolyte; that is, the electrolyte means 5C may be comprised of an anion exchange membrane or an aqueous alkaline electrolyte adsorbed in a porous matrix. The structure for supplying reformate to the hydrogen chamber means 3 is identical to that utilized in the system shown in FIG. 1.

The principal distinction in the system shown in FIG. 4 over that shown in FIG. 1 is that reaction products from the fuel cell are rejected from the hydrogen chamber means rather than the oxidant chamber means. Accordingly, a somewhat altered, although analogous, structural arrangement is provided.

The unreacted portions of the reformate along with the reaction products of the fuel cell are exhausted through conduit means 111 to a heat exchanger 113. An air supply means 115 is provided which delivers air through conduit means 117 to the heat exchanger 113. A portion of the moisture present in the exhaust stream from the fuel cell is condensed in the heat exchanger and is delivered to the water supply means by conduit means 119 and pump means 121.

The air supplied to the heat exchanger 113 is exhausted through conduit means 123 to a humidifier 125. Conduit means 127 conducts the humidified air to the oxidant chamber means. The unreacted portions of the air stream are exhausted to the atmosphere at 129.

The portion of the exhaust stream from the hydrogen chamber means that is not condensed in the heat exchanger 113 is conducted to the refrigerator 131 through conduit means 133. The refrigerator is shown provided with a gas powered refrigeration unit 135. Heat is taken from the incoming exhaust stream to condense additional water therefrom. Conduit means 137 provides for the transport of this water to the water source means. Heat is rejected by the refrigeration unit to the air. As shown air is delivered to the refrigerator through duct means 139 and exhausted at 141.

The exhaust stream from the refrigerator may be vented to the atmosphere as indicated at 143. Alternately, the exhaust stream may be directed to the burner 27 of the reformer. For this purpose a valve means 145 is provided to close off vent 143 and a conduit means 147 controlled by valve means 149 is shown extending to the burner. As a further auxiliary feature the exhaust stream may be diverted back to the feed at or upstream of the reformer. To accomplish this a conduit means 151 equipped with a flow regulator means 153 is shown, which is analogous to the conduit means 47 equipped with flow regulator means 49 in FIG. 1. A portion of the fuel cell exhaust stream is used to power the refrigeration unit as indicated by means 155.

FIG. 5 schematically illustrates a system for generating electrical energy in which a fuel cell 1D is used provided with an electrolyte means 5D comprised of a free aqueous alkaline electrolyte. Potassium hydroxide is typical of an electrolyte of this type. Potassium hydroxide is highly sensitive to small concentrations of carbon monoxide. Accordingly, the fuel cell is provided with a modified hydrogen chamber means 3D which includes a hydrogen diffusion barrier 157. The diffusion barrier selectively permits the penetration of hydrogen while preventing penetration by other gases. Conventional diffusion barriers are constructed of palladium or palladium alloys in thin sheet or foil form.

Aqueous alkaline electrolyte fuel cells are generally operated at relatively high temperatures—e.g., up to approximately 500° F. Accordingly, the system of reforming to generate hydrogen and for circulating the electrolyte is substantially identical to the structural system illustrated in FIG. 3, differing only by the inclusion of the carbon monoxide reducing means 31.

The hydrogen stream entering the hydrogen chamber means through conduit means 33 contains hydrogen, water vapor, methane, carbon dioxide, and only small quantities of carbon monoxide. The entering stream is separated from the anode by the diffusion barrier. The hydrogen present diffuses through the barrier and is free to react at the anode. The remainder of the reformate along with a small proportion of hydrogen may be vented to the atmosphere as indicated at 159.

A portion of the hydrogen is circulated from the hydrogen chamber means in a warm, moisture laden condition through conduit means 161 to heat exchanger 163. A portion of the moisture is condensed in the heat exchanger and returned to the water source means by conduit means 165 and pump means 167. To accept heat from the hydrogen exhaust stream an air source means 115 is provided which delivers air to the heat exchanger through duct means 117. The warmed air is supplied to the fuel cell oxidant chamber means through conduit means 169. As an optional, but preferred, feature a carbon dioxide scrubber 170 is shown mounted in the oxidant conduit means to prevent poisoning of the cathode. It is noted that since a free aqueous electrolyte is employed, it is preferred to omit a humidifier to increase the moisture content of the warmed air stream.

To allow further water recovery from the hydrogen exhaust stream hydrogen is supplied to a refrigerator 131B through conduit means 171. The refrigerator is equipped with a refrigeration unit 135B which differs from refrigeration unit 135 in being electrically powered rather than gas powered. The portion of the moisture in the hydrogen exhaust stream condensed in the refrigerator is returned to the water source means through conduit means 173. The relatively dry hydrogen stream remaining is returned to the hydrogen chamber means between the diffuser and the anode through conduit means 175. If desired, a heat exchanger may be provided to first, at least partially, equilibrate the temperature of the returning hydrogen stream with that of the electrolyte. Conduit means 139 and 141 are provided to deliver air which accepts heat rejected by the refrigerator. A control means 177 is provided to allow regulation of the refrigerator.

While I have specifically disclosed certain preferred embodiments of systems constructed according to my invention, it is recognized that certain of the advantages of my invention may be achieved in employing only parts of the structural combinations illustrated. For example, each of the systems illustrated in FIGS. 1–5 inclusive show a hydrogen stream being derived from reformable fuel and water source means. In applications where hydrogen is initially available the reformable fuel and water source means, the vaporizer, the reformer, the refrigerator, and various return conduit means could be omitted. The remaining system would still provide the advantages of controlling the humidity of the oxidant and of equilibrating the temperature of the reactants with that of the fuel cell prior to contact with the fuel cell. In certain applications it may be unnecessary to recover the water formed as a reaction product by the fuel cell. In such circumstance it may be desirable to omit the refrigerator and the water return conduit means. In still other circumstances it may be desirable to recover the water formed by the fuel cell, although it may not be necessary to return the water to the fuel cell. In such cases the system serves as a water source as well as an electrical energy source.

It is appreciated that in addition to using only parts of the systems illustrated, it may be desirable to modify the systems. For example, each of the fuel cells shown are operated on air. The fuel cells could alternatively be operated on any other conventional oxidant. In the system shown in FIG. 1 this could be accomplished merely by connecting the conduit means 61 to a separate oxidant source means. In certain systems it may be desired to use ambient air relying entirely on natural convective air currents for circulation. In such instance the oxidant chamber means could be omitted from the fuel cells shown. The air used for the various heat exchange functions would then be separate from the air used as a fuel cell reactant. If desired, the systems may be supplied with conduit means for the circulation of water from the water source means to the humidifiers. It is considered that it would be well within the skill of the art to provide additional pump means and flow regulation means where desired in the illustrated systems. Further, in certain circumstances it may be possible to omit one or more of the pump means and valve means illustrated. For example, where the refrigerator is located above the water source means, it may not be necessary to provide a pump means therebetween.

In the practice of my process it is preferred to generate a hydrogen stream for oxidation in a fuel cell rather than to supply hydrogen dirctly, although this could be done if desired. It is preferred that the hydrogen stream be generated by reforming a mixture of water and a low cost reformable fuel, such as hydrocarbon or alcohol. Economic considerations favor the use of fluent hydrocarbons, such as those having an approximate average molecular weight less than eicosane. Hydrocarbons having an average molecular weight less than that of dodecane are generally most preferred in view of their greater reactivity. It is preferred to use hydrocarbons from the alkane and alkene series. The sulfur content of the fuel should be maintained less than 4000 p.p.m. and preferably less than 1000 p.p.m. It is most preferred to utilize fuels having a sulfur content of less than 40 p.p.m. It is then apparent that any of a wide variety of commercially available hydrocarbons may be employed ranging from Bunker C crude oil to commercial gasolines to LPG to natural gas. In certain applications where the emphasis is to be placed on water recovery rather than fuel cost it may be desirable to utilize one or more alcohol derivatives of the aforenoted hydrocarbons. Alcohols provide the advantage of forming somewhat larger proportions of water while consuming somewhat smaller amounts of water in reforming. This allows somewhat less stringent water recovery procedures than may be required with hydrocarbons. While hydrocarbons and alcohols are specifically set out as suitable reformable fuels, being economically preferred, it is appreciated that any reformable fuel known to the art may be employed. As used herein the term "reformable" refers to any fuel which can be reacted with water to generate hydrogen.

The water used in reforming may be fresh or saline and is preferably tap water. The proportion of water to hydrocarbon should be maintained at a ratio of 2.71 to about 6.45 molecules of water per carbon atom in order to achieve maximum utilization of the feed, although somewhat lower ratios may be used with alcohols. The water and fuel may be reacted in any conventional apparatus for generating hydrogen. It is preferred to react the hydrocarbon or alcohol and water in the presence of a reforming catalyst at temperatures of from 800 to 1400° F. and at approximately atmospheric pressure. If the pressure is varied corresponding variations in reforming temperatures may be expected. In order to avoid the disadvantages of operating at high pressure, it is preferred that the feed stock be maintained at only sufficient pressure to drive the feed toward the fuel cell. It is preferred that the same feed stock be used to supply fuel to the reformer and to heat the reformer to the desired temperature of operation. This is accomplished by delivering a portion of the feed stock to a burner associated with the reformer.

When using a fuel cell intended to be operated at a temperature of below approximately 200° F., it is desirable to remove a portion of the heat from the reformate delivered from the reformer. To avoid heat waste it is a feature of my process that the reformate is heat exchanged with the water and fuel mixture entering the reformer. This allows the water to be converted to steam prior to entry into the reformer. With fuel cells operating above approximately 200° F. it may be desirable to vaporize the water supplied to the reformer by heat exchange with the electrolyte.

The reformate may be additionally chemically modified as required in order to meet the fuel needs of the fuel cell. For example, with conventional catalytic reforming of water and hydrocarbon or alcohol mixtures the reformate will be comprised of hydrogen, water vapor, carbon dioxide, carbon monoxide, methane, and trace amounts of impurities and miscellaneous hydrocarbon alcohols. Except for phosphoric acid electrolyte fuel cells, it is necessary to reduce the carbon monoxide content. Certain types of fuel cells are more sensitive than others to carbon monoxide. The exact amounts of carbon monoxide permissible in the hydrogen stream supplied to the fuel cell will depend on the particular type of electrodes and electrolyte as well as the temperature chosen for operation. It is preferred to use one or both of two conventional techniques to reduce the carbon monoxide content of the reformate. According to one technique the carbon monoxide and hydrogen present in the stream are reacted in the presence of a catalyst to generate methane and water. This reaction, conventionally termed "methanation," is typically conducted at temperatures in the range of from 400° F. to 450° F. The remaining technique is conventionally referred to as carbon monoxide shifting. According to this reaction, performed at temperatures in the range from 400° F. to 750° F., carbon monoxide and water are reacted in the presence of a catalyst to generate hydrogen and carbon dioxide. It is appreciated that additional purification of the reformate by conventional techniques could be used without departing from the purview of the invention.

It is one feature of my process to reduce the thermal gradient between the fuel cell and the reactants supplied thereto. When the fuel feed is a reformate, it is preferred to reject heat from the reformate prior to delivery to the fuel cell. Heat from the reformate may be rejected to the air, to the electrolyte, and/or to a coolant associated in heat transfer relation with the electrolyte. Where the hydrogen feed stock is initially at ambient temperatures it may be necessary to heat the feed. This may be accomplished by conventional warming techniques or by transferring heat from the electrolyte to the feed.

The oxidant supplied to the fuel cell is also preferably increased in temperature to reduce the thermal gradient with respect to the fuel cell. This may be accomplished by at least partially equilibrating the oxidant stream entering the fuel cell and the exhaust stream from either the oxidant or fuel chambers. Alternately, the temperature of the oxidant stream and the electrolyte may be equilibrated. In a preferred form of the invention the exhaust stream from the fuel cell bearing the reaction products thereof is used to heat the incoming oxidant stream. This provides the additional advantage of condensing at least a portion of the water present in the exhaust stream. Where the fuel cell feed stock is derived from reforming a fuel-water mixture, the condensed water may be used to replenish the water supplied to the feed stock. The exhaust stream bearing the reaction products may additionally be refrigerated below ambient temperature to condense additional water therefrom for replenishing of water used in the feed stock or for any other desired use.

In operating a fuel cell the rate at which reactants are consumed is dependent on the electrical load placed across the electrodes of the fuel cell. When no current is supplied, no fuel or oxidant is consumed. It is generally preferred to deliver reactants to the fuel cell at a rate substantially in excess of the rate of consumption. Of course, it is recognized where a pure fuel or a pure oxidant such as pure hydrogen or pure oxygen is employed, these may be supplied at the rate consumed. Where air is employed as an oxidant, however, the negligible additional costs of supplying more than the chemically required amounts are more than off-set by enhanced fuel cell performance. It may be desirable to supply fuel at a rate in excess of the reaction rate and to recycle the excess fuel. For example, where a reforming operation is performed, it may be desirable to reform at a steady rate even though the electrical load is variable. In such case excess hydrogen supplied when the electrical load is low may be recycled upstream of the fuel cell.

Having now described certain preferred embodiments of my invention, it is noted that numerous modifications will be readily suggested to those skilled in the art. It is accordingly intended that the scope of my invention be determined with reference to the following claims.

What I claim as new and desire to secure by Letters of the United States is:

1. A process for generating electrical energy comprising providing an electrolyte in ionically conductive relation between an anode and a cathode serving as electrodes of a fuel cell, reacting a mixture of water and a reformable fuel to generate a reformate including hydrogen, delivering hydrogen from the reformate to the anode, delivering an oxidant to the cathode, replenishing water consumed in generating the reformate with water formed as a reaction product by the fuel cell, exchanging heat between the reformate and the electrolyte upstream of the anode, and rejecting the heat of the reformate and the electrolyte upstream of the anode, and rejecting the heat of the reformate and the electrolyte simultaneously to an air stream so that the reformate and the electrolyte are partially equilibrated at a lower temperature.

2. A process of generating electrical energy according to claim 1, in which the temperature of the oxidant is at least partially equilibrated with the temperature of the fuel cell upstream of the cathode.

3. A process for generating electrical energy according to claim 1 in which at least a portion of the water formed as a reaction product by the fuel cell is condensed by cooling below ambient temperature.

4. A process of generating electrical energy according to claim 1, with the additional step of delivering a portion of the air stream as oxidant to the cathode of the fuel cell after heat has been received by the air from the electrolyte and the reformate.

5. A process for generating electrical energy according to claim 1, wherein said step of exchanging heat between the reformate and the electrolyte includes circulating a coolant in indirect heat transfer relationship between the electrolyte and the reformate, and said step of rejecting the heat of the electrolyte to an air stream includes circulating the coolant in indirect heat transfer relationship between the electrolyte and the air stream.

6. A system for generating electrical energy comprised of a fuel cell formed of a cathode, an anode, electrolyte means interposed between said cathode and said anode to provide ionic conductivity therebetween, means for delivering an oxidant to said cathode, means forming a hydrogen chamber adjacent said anode, means serving as a water source, means serving as a fuel source, means extending between each of said source means and said hydrogen chamber means including means for reforming a mixture of water and fuel from said source means to generate a reformate including hydrogen gas, means for delivering water formed as a reaction product by said fuel cell to said means serving as a water source, and heat exchange means for transferring heat between the reformate and said electrolyte upstream of said anode and for rejecting heat simultaneously from both the reformate and said electrolyte to an air stream passing through said heat exchange means so that the temperatures of the reformate and said electrolyte are partially equilibrated at a lower temperature.

7. A system for generating electrical energy according to claim 6, additionally including means for recirculating hydrogen gas from said hydrogen chamber means to said means for reforming.

8. A system for generating electrical energy according to claim 6, including a heat exchange means for receiving the oxidant upstream of said cathode and for condensing the water recovered from the reaction product.

9. A system for generating electrical energy according to claim 6 wherein said heat exchange means includes a coolant fluid, and circulation means for passing said coolant fluid in indirect heat exchange relationship between said electrolyte and both the reformate and air stream.

References Cited

UNITED STATES PATENTS

| | | | |
|---|---|---|---|
| 2,901,524 | 8/1959 | Gorin et al. | 136—86 |
| 2,980,749 | 4/1961 | Broers | 136—86 |
| 3,061,658 | 10/1962 | Blackmer | 136—86 |
| 3,080,442 | 3/1963 | Hobert | 136—86 |
| 3,112,228 | 11/1963 | Young | 136—86 |
| 3,141,796 | 7/1964 | Fay et al. | 136—86 |
| 3,179,500 | 4/1965 | Bowen et al. | |
| 3,278,268 | 10/1966 | Ptefferle. | |
| 3,300,341 | 1/1967 | Gregory et al. | 136—86 |
| 3,328,204 | 6/1967 | Grubb | 136—86 |
| 3,330,699 | 7/1967 | Tantram | 136—86 |

ALLEN B. CURTIS, Primary Examiner